(12) United States Patent
Higgins et al.

(10) Patent No.: US 12,598,479 B2
(45) Date of Patent: Apr. 7, 2026

(54) FIXED WIRELESS SELF-INSTALLATION SYSTEM AND METHOD

(71) Applicant: Digital Path, Inc., Chico, CA (US)

(72) Inventors: James A. Higgins, Chico, CA (US); Ethan Higgins, Chico, CA (US); Ryan LaMont, Chico, CA (US)

( * ) Notice: Subject to any disclaimer, the term of this patent is extended or adjusted under 35 U.S.C. 154(b) by 229 days.

(21) Appl. No.: 18/337,381

(22) Filed: Jun. 19, 2023

(65) Prior Publication Data

US 2024/0422570 A1     Dec. 19, 2024

(51) Int. Cl.
    *H04L 41/22*        (2022.01)
    *H04W 16/18*      (2009.01)

(52) U.S. Cl.
    CPC .............. *H04W 16/18* (2013.01); *H04L 41/22* (2013.01)

(58) Field of Classification Search
    CPC ................................ H04W 16/18; H04L 41/22
    See application file for complete search history.

(56) References Cited

U.S. PATENT DOCUMENTS

| | | | |
|---|---|---|---|
| 11,544,296 B1 * | 1/2023 | Krishnan | ................ G06F 16/29 |
| 2018/0025649 A1 * | 1/2018 | Contreras | ............ B64C 39/024 |
| | | | 701/3 |
| 2019/0066485 A1 * | 2/2019 | Roberts | ................. G08B 19/00 |

* cited by examiner

*Primary Examiner* — Michael T Vu
(74) *Attorney, Agent, or Firm* — FisherBroyles, LLP; Rob L. Phillips

(57) ABSTRACT

A system and method for positioning and installing a broadband antenna involves collecting land parcel information from various sources including laser imaging, detection and ranging (LIDAR) data to identify the shapes of buildings, vegetation, and other geographic features of a parcel, including the size, geocoordinates, height of each and their proximity to each other within the parcel, as well as their proximity to other buildings, vegetation and other geographic features on other parcels or open space. To overlay RF on each parcel, as well as the buildings and vegetation upon them, the details of each broadcast point are entered into the system. This information may include the geocoordinates of the location, the geocoordinates of each broadcast antenna, the azimuth of each broadcast antenna, elevation, tilt, antenna gain, transmit power, operating frequency range or channel, and any attenuation or loss associated with the hardware configuration, or the frequencies used.

24 Claims, 12 Drawing Sheets

200-1

ENTER ADDRESS

COLLECTING PARCEL DATA...

200-3

DROP A PIN AT THE CENTER OF YOUR DESIRED SERVICE LOCATION
OR PREFERRED LOCATION FOR INSTALLATION OF BROADBAND
RECEPTION ANTENNA 250-1

255

BEST ELEVATION IS 14 FEET

Change Install Elevation

Satellite

Street

Terrain 200-7

AVAILABLE BROADCAST LOCATIONS

470MBs

430MBs 200-9

FIXED WIRELESS SELF-INSTALLATION SYSTEM AND METHOD

FIELD OF THE INVENTION

The embodiments of the present invention broadly relate to software and systems used to measure RF coverage at geographical locations and elevations, display the results in a visual, user-friendly manner, instruct a user where to install a wireless device to receive a usable signal including which direction to aim the wireless device and at what elevation to set the wireless device, and provide an interface for measuring alignment and performance and provision service.

BACKGROUND

RF signals are used to transmit all types of content and information including voice data, video data, static image data, websites, databases, etc. In many cases, receiving the RF signals at a home, business or other location can be challenging due to environmental conditions. In many instances, users rely on a third party to install appropriate systems for receiving the desired RF signals. This can be time-consuming and costly.

It would be beneficial to have a system and method configured to permit users to self-install systems (e.g., home wireless internet) for receiving RF signals.

SUMMARY

The embodiments of the present invention broadly contemplate the use of various types of databases, algorithms, and interfaces to display radio frequency (RF) signal strengths at different geographical locations and at different elevations. The system may be used for a multitude of reasons including, but not limited to, enabling persons to identify the best location to install a wireless broadband reception antenna, and provide instruction for proper installation and self-configuration of the antenna and/or services.

In one embodiment, the system collects land parcel information from various sources, including county assessor systems and paid or free data sources that identify parcel information; not limited to address, lot size, lot shape, geocoordinates and locations of buildings. The system also uses laser imaging, detection and ranging (LIDAR) data to identify the shapes of buildings, vegetation, and other geographic features of a parcel, including the size, geocoordinates, height of each and their proximity to each other within the parcel, as well as their proximity to other buildings, vegetation and other geographic features on other parcels or open space. Additional inputs may be added, such as street views, 3D imaging or any other system that provides data on the characteristics of buildings, vegetation (including density) or parcels (including slope and elevation). The age of the data may factor into the calculations and therefore an additional system feature may be growth calculations for vegetation, as vegetation may affect the quality of the RF signal received at each location on a parcel.

To overlay RF on each parcel, as well as the buildings and vegetation upon them, the details of each broadcast point are entered into the system. This information may include the geocoordinates of the location, the geocoordinates of each broadcast antenna, the azimuth of each broadcast antenna, elevation, tilt, antenna gain, transmit power, operating frequency range or channel, and any attenuation or loss associated with the hardware or software configuration, or the frequencies used.

The system may provide guidance to the user through a web interface or smart device application for entering location information and may provide web links to additional information sources. The system may accept location information in the form of an address or geocoordinates from a user or geolocate the user through their smart device. The system may validate the query against an internal or external database and may provide a list of locations that may be a match to the information entered in the query. The system may propose the best signal within a given area through the use of Artificial Intelligence (AI) or some other system and/or the user may then select the location from the list and submit it to the system for processing or the system may initiate processing the request as soon as the user selects.

The system may then display an image of the location (the view may be satellite type view looking down on the location). The image may provide the ability to change the characteristics of the image, such as type of image (satellite, street, terrain, dark, light, 3D, or other map type), zoom level, legend, instructions, and/or what features are displayed. The system may prompt the user to select a location on the parcel, a building, tree, or other feature on which to install a broadband reception antenna or the system may suggest an installation location. Suggested installation locations may be based on user inputs and/or AI and may include factors related to ease of installation and locations with the best signal. The system may also allow the user to change the size of the area where RF signal or signals are displayed at or around the location chosen. The system may prompt or allow the user to view RF signals at different elevations within the displayed RF signal. The benefits of said adjustments may enable the user to determine where and at what height above the ground to install the broadband reception antenna for best reception.

Once a user has selected a location and height to install the broadband reception antenna, the system may display additional RF propagation, a summary of the user's selections, additional maps, imagery, installation location alternatives and a list of available broadcast locations. The system may also display a line between the installation location chosen by the user and the broadcast location. Additionally, the system may show multiple lines if multiple broadcast locations are available for use at the installation location. Each broadcast location listed may include information specific to the link between the chosen installation location and the broadcast location, such as signal(s), distance, direction, and link quality. The system may color code the RF signals and link quality to better assist the user in choosing an installation location or the system may select the best location for the user. The system may allow the user to select the broadcast location or the system may select it. The displayed information may allow the user to make an informed decision on where to mount the broadcast reception antenna, at what height and which direction to aim it.

Once a user or the system has selected a broadcast location to connect to, the system may collect information from the user. This information may be specific to the user's preferences for mount types, cable lengths, accessories, and services for which the user may wish to subscribe. The system may also collect information specific to the user, including but not limited to name, email address, phone number, service address, shipping address, unit or apartment number, existing services, payment information and preferred method of contact. The system may require the user to agree to certain terms and conditions prior to finalizing their order for equipment and services and/or provide additional information related to the self-installation of the equipment. The system may require the user to electronically sign or sign with an input device, a service agreement and/or certain terms and conditions.

The system may store the user's inputs in a database at each step. The system may then send the user's input to a person or system to validate the inputs and/or approve or deny the order. If the order is denied, the system may send an email, text or other notification to the user informing them of the decision and may provide options for correcting deficiencies in the information provided, correcting errors or other ways to make the order acceptable. If the order is approved, the system may advance the user into one or many systems, including but not limited to: a billing system, monitoring system, authentication system, mapping system or order provisioning. The system may also send the user's information to a person or system to configure the user's equipment to connect automatically when it is powered on, package, ship and notify the user of the status of their order.

The system may send the user information related to their account and installation when their equipment is shipped or delivered to them, including a copy of their service agreement. This information may include a map or image of their installation location, account details (including login information), and instructions for installing and/or connecting the hardware. The system may also provide an interface useable on the user's mobile device or personal computer for the alignment, testing and troubleshooting of the equipment and/or services. The system may provide a user with the ability to move the equipment to a new location by guiding the user through the original process used to check for RF at their current location. In such an embodiment, the process may be modified to skip the approval, provisioning, and/or shipping steps. The interface provided by the system may be accessed with a QR code or URL generated during the provisioning process. The interface may also allow the user to access their account to check usage, make changes, upgrades, make payments and terminate or suspend services.

Other variations, embodiments and features of the present invention will become evident from the following detailed description, drawings and claims.

DETAILED DESCRIPTION

Figure 1:
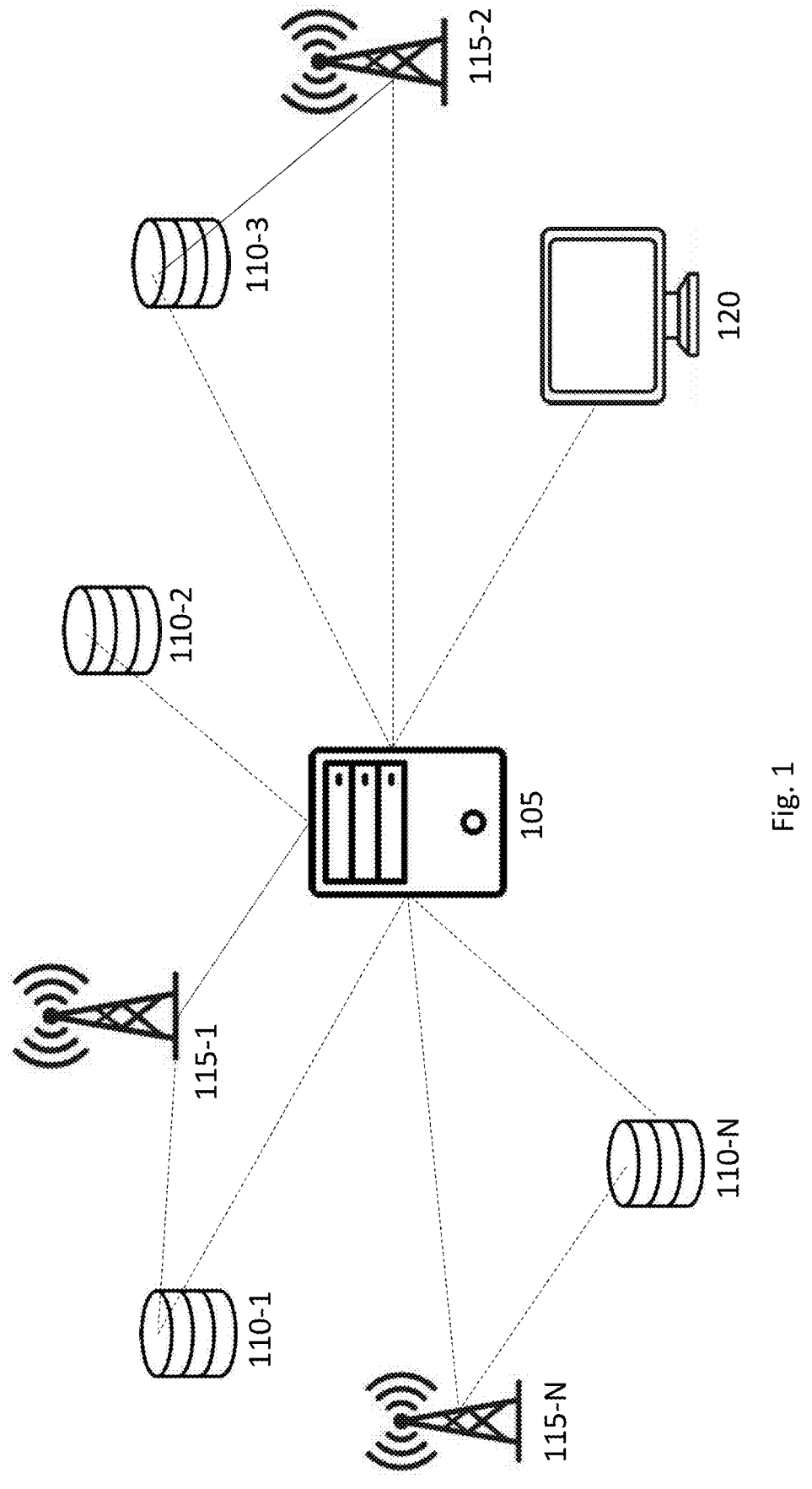
FIG. 1 illustrates a system architecture of the type used to facilitate the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object-oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

FIG. 1 shows a system architecture 100 according to the embodiments of the present invention. A central server 105 having one or more processors runs various software programs, applications, etc., as detailed below. The central server 105 receives data from one or more remote databases or data sources 110-1 through 110-N. In one embodiment, the information is received via wireless connections between the central server 105 and various databases or data sources 110-1 through 110-N. Alternatively, the data may be transmitted via wires or fibers connecting the central server 105 and various databases or data sources 110-1 through 110-N. The databases or data sources may include information related to a parcel of land on which a proposed RF receiver system is being installed. By way of example, the databases may include access to county assessor systems, paid or free data sources that identify parcel information including address, lot size, lot shape, geocoordinates and locations of buildings, laser imaging, detection and ranging (LIDAR) data to identify the shapes of buildings, vegetation, and other geographic features of a parcel, including the size, geocoordinates, height of each and their proximity to each other within the parcel, as well as their proximity to other buildings, vegetation and other geographic features on other parcels or open space, street views, 3D imaging or any other system that provides data on the characteristics of buildings, vegetation (including density) or parcels (including slope and elevation).

Other databases may transmit the details of each broadcast point 115-1 through 115-N into the system via the central server 105 or elsewhere. The broadcast points 115-1 through 115-N may report such information to selective databases in generally real time. This information may include the geocoordinates of the location, the geocoordinates of each broadcast antenna, the azimuth of each broadcast antenna, elevation, tilt, antenna gain, transmit power, operating frequency range or channel, and any attenuation or loss associated with the hardware configuration, or the frequencies used. While the databases 110-1 through 110-N are shown remote from the broadcast points 115-1 through 115-N they may also be proximate to one another. As shown in FIG. 1, this information may also be transmitted to the central server 105 directly by equipment at the broadcast point 115-01 through 115-N without the need for an intermediary database 110-1 through 110-N.

A web interface 120 provides means for the property owner or other interested entity to communicate with the system as well as input and receive data as needed. While the interface 120 is shown as a computer display is may also be a mobile device display such as a cellular phone or tablet. Inputting data may be accomplished via touch screen displays, buttons, a mouse, voice, joystick or other mechanism.

In one embodiment, the system accepts, via the interface 120, installation location information in the form of an address or geocoordinates from a user. The system validates the query against an internal or external database and may provide a list of locations that may be a match to the information entered in the query. The system proposes the best signal within a given area and/or the user may then select the location from the list and submit it to the system for processing or the system may initiate processing the request as soon as the user selects.

The system, via the interface 120, may then display an image of the location (the view may be satellite type view looking down on the location). The image may provide the ability to change the characteristics of the image, such as type of image (satellite, street, terrain, dark, light, or other map type.) zoom level, legend, instructions, and/or what features are displayed. The system, via the interface 120, may prompt the user to select a location on the parcel, a building, tree, or other article on which to install a broadband reception antenna. The system, via the interface 120, may also allow the user to change the size of the area where RF signal or signals are displayed at or around the location chosen. The system, via the interface 120, may prompt or allow the user to view RF signals at different elevations within the displayed RF signal. The benefits of said adjustments may enable the user to determine where and at what height above the ground to install the broadband reception antenna for best reception.

Once a user or the system has selected a broadcast location to connect to, the system may collect additional information from the user via the interface 120. This information may be specific to the user's preferences for mount types, cable lengths, accessories, and services for which the user may wish to subscribe. The system may also collect information specific to the user, including but not limited to name, email address, phone number, service address, shipping address, unit or apartment number, existing services, payment information and preferred method of contact. The system may require the user to agree to certain terms and conditions prior to finalizing their order for equipment and services and/or provide additional information related to the self-installation of the equipment. The system may require the user to electronically sign or sign with an input device, a service agreement and/or certain terms and conditions.

FIGS. 2A through 2I show various screen shots associated with a user interface which permits a user to self-install a broadband reception antenna.

Figure 2A:
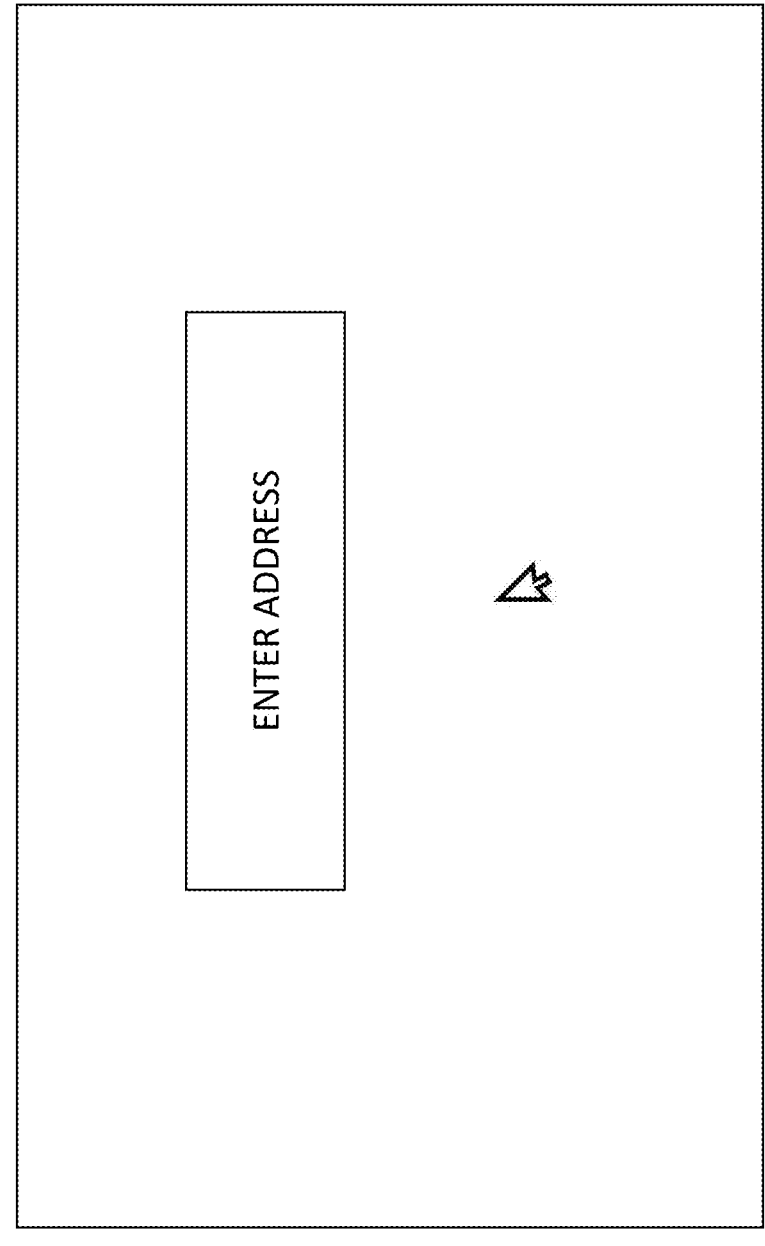
FIGS. 2A-2I illustrate exemplary screen shots depicted on an interface configured to support self-installation of a broadband reception antenna according to the embodiments of the present invention.
Figure 2B:
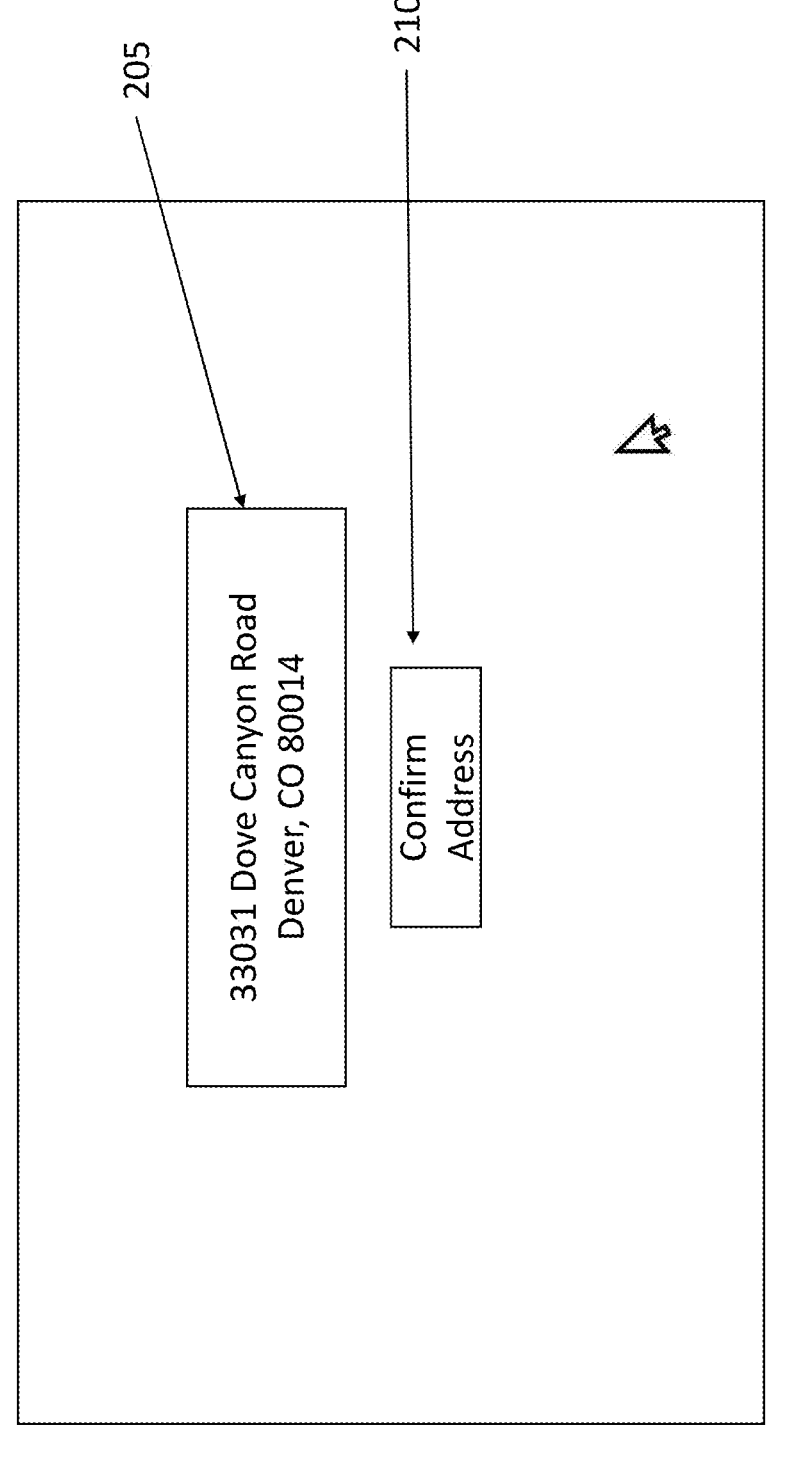
Figure 2C:
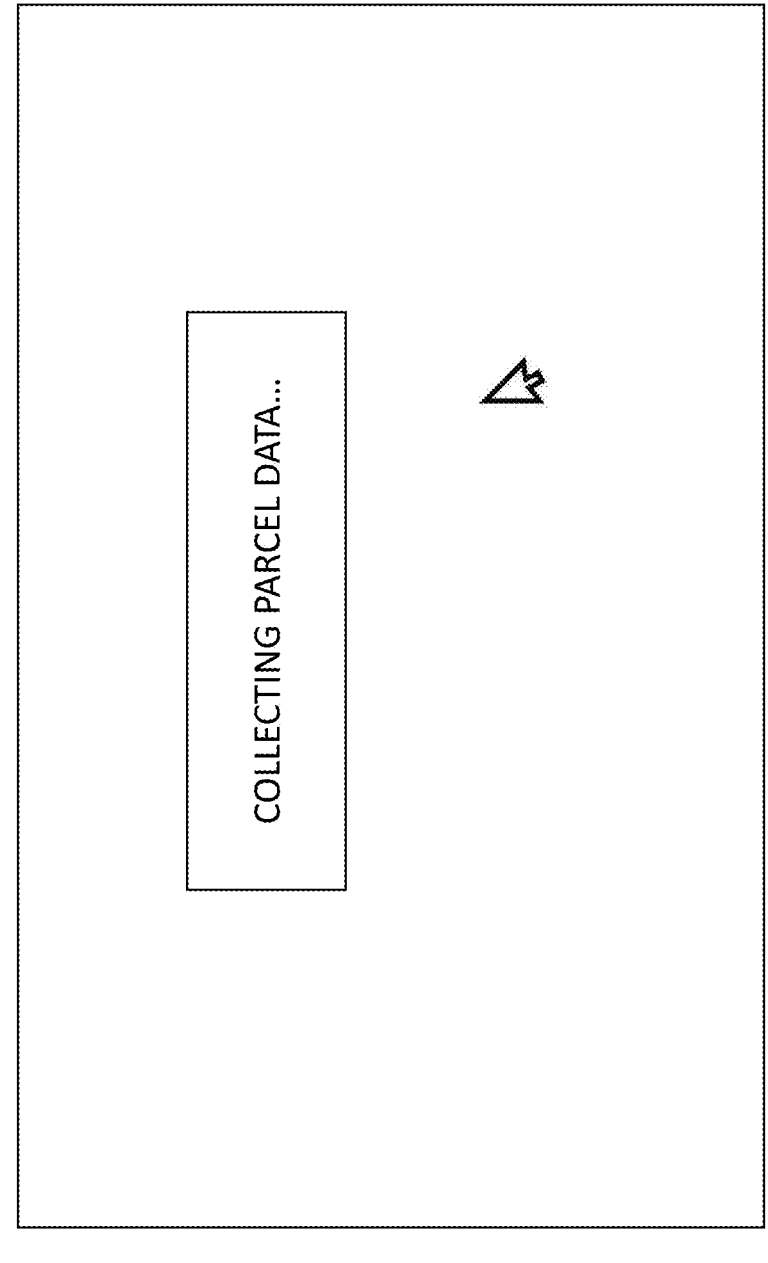

FIG. 2A shows a home screen shot 200-1 where a user can enter an address for installation of a broadband reception antenna. The system may be configured to confirm the address or pre-populate the data box 205 as the address is input. Once the address is completely entered, as shown in screen shot 200-2 of FIG. 2B, the user may confirm the address using active link 210. Once the address is confirmed, as shown in screen shot 200-3 of FIG. 2C, the system begins collecting relevant data based thereon.

In one embodiment, the system collects date related to the address entered. Such data may come from various sources, including county assessor systems and paid or free data sources that identify parcel information, including but not limited to address, lot size, lot shape, geocoordinates and locations of buildings. The system may also use LIDAR data to identify the shapes of buildings, vegetation, and other geographic features of a parcel, including the size, geocoordinates, height of each and their proximity to each other within the parcel, as well as their proximity to other buildings, vegetation and other geographic features on other parcels or open space. Additional inputs may be added, such as street views, 3D imaging or any other system that provides data on the characteristics of buildings, vegetation or parcels. The collected data is ultimately used by the system to estimate/predict the RF signal quality across the parcel and locations on the parcel where the RF signal is the best or strongest.

In one embodiment, the system may include or access data related growth calculations for vegetation on the property, as vegetation may affect the quality of the RF signal received at each location on a parcel. The growth calculations may be used to estimate the current state of the vegetation assuming the collected data is not up-to-date. Then, the system may incorporate the data relative to the estimated vegetation to determine the RF sign quality at the parcel.

Figure 2D:
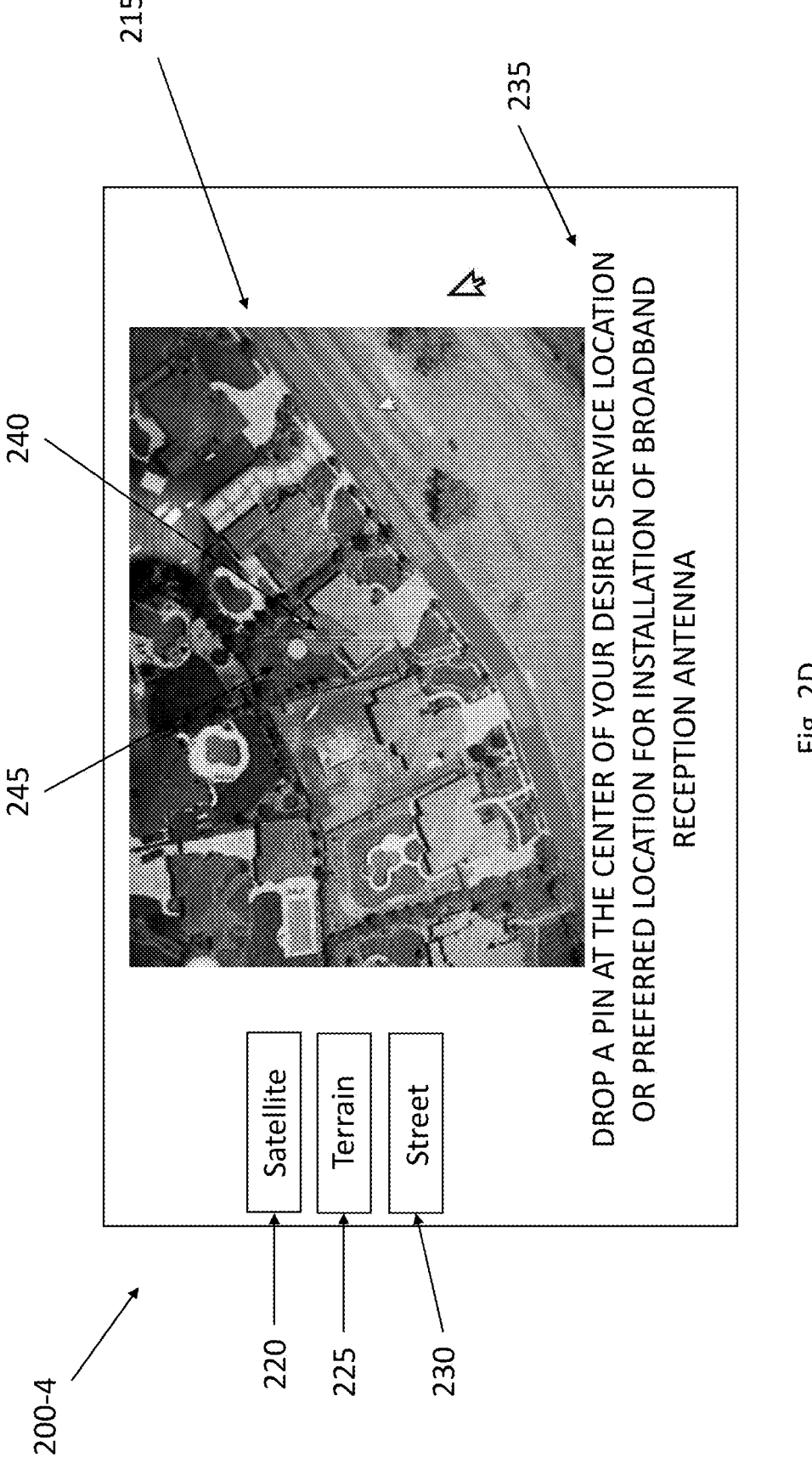

In one embodiment, once the parcel associated with the confirmed address is confirmed, the system causes an aerial/satellite image of the parcel to be displayed on interface 120. When displayed, the user may be prompted to confirm the parcel (not shown). Screen shot 200-4 of FIG. 2D shows a parcel image 215 displayed. Screen shot 200-4 also includes various active links 220, 225 and 230 to change the image to a satellite image, terrain image or street image. Other views are conceivable. Screen shot 200-4 includes a request 235 for the user to drop a pin 240 on the parcel 245 in question. Dropping the pin 240 may also be used to confirm the address. The pin 240 may be dropped using the cursor or touch screen display depending on the type of interface 120.

Figure 2E:
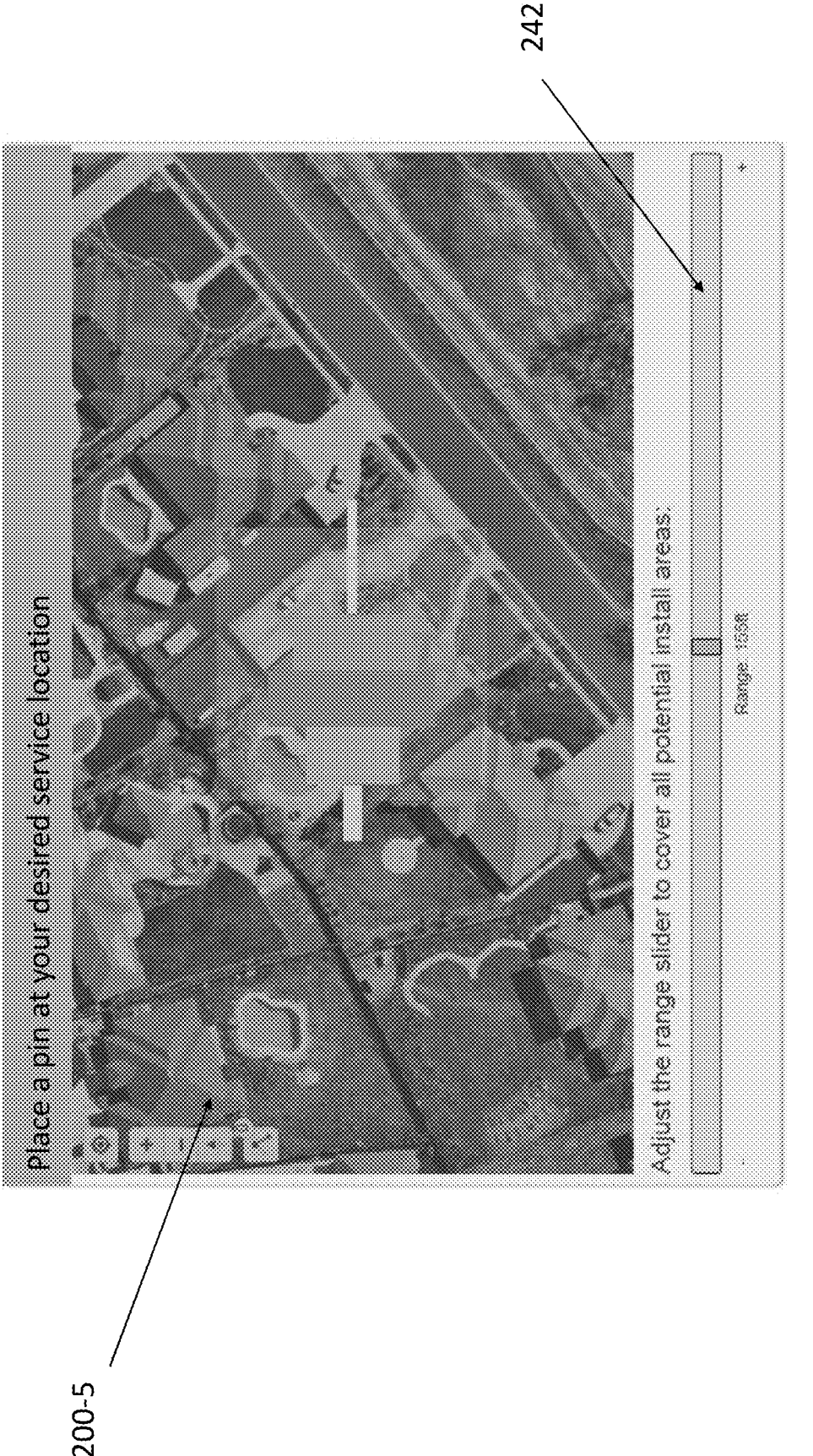
Figure 2F:
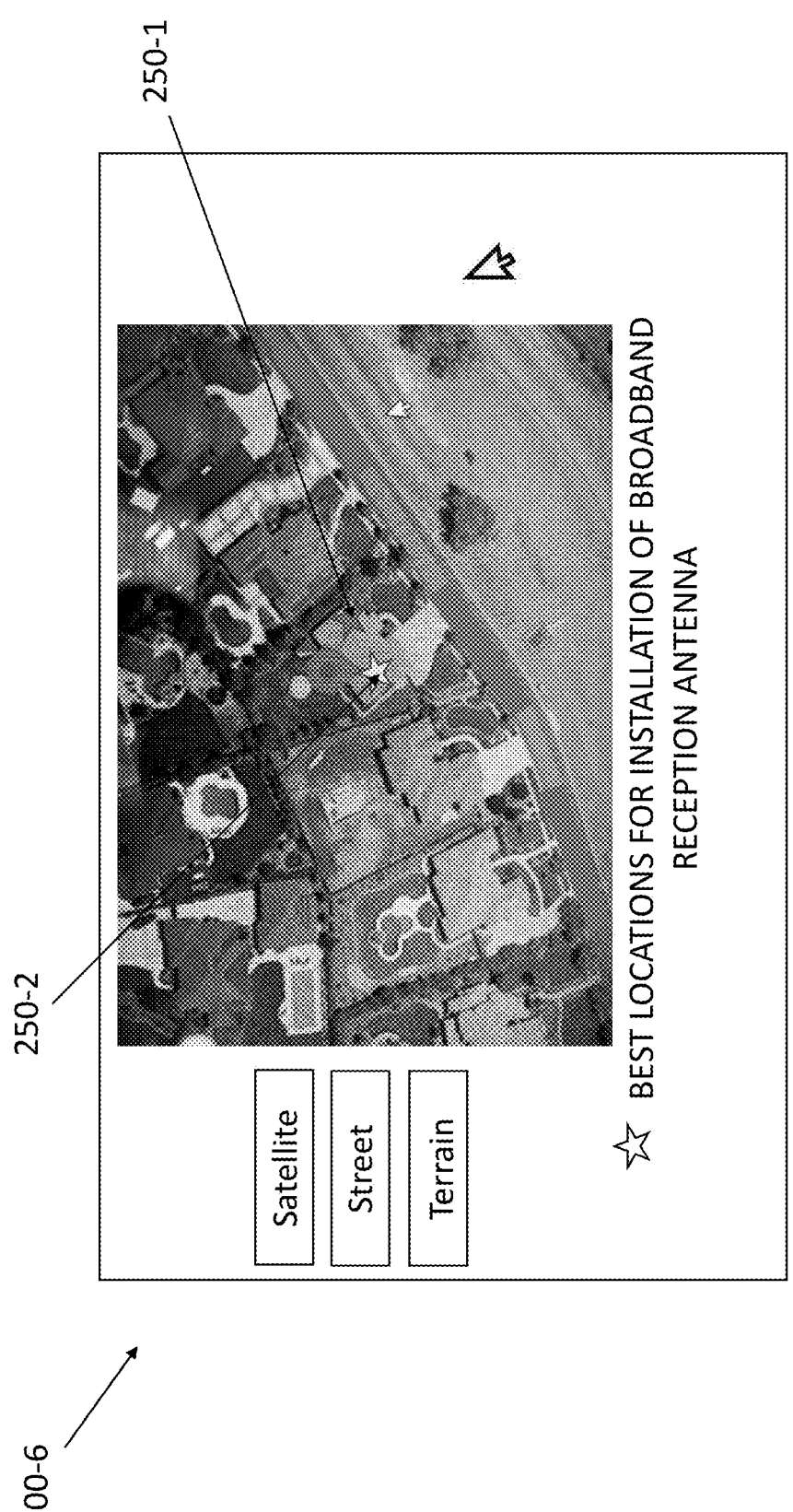

Once the parcel is confirmed by the user via the dropping of the pin 240 or otherwise, as shown in screen shot 200-5 of FIG. 2E, the user may adjust the desired range using a slider 242 to make sure the entire parcel is evaluated for RF signal quality. A user may also use a drawing tool to indicate the area they would like evaluated for RF signal quality. The system provides RF signal quality, as previously determined, to the user via the interface 120. The RF signal quality may be displayed in various ways. As shown in screen shot 200-6 of FIG. 2F, the system causes one or more indicators (stars in this instance) 250-1 and 250-2 of a strong RF signal quality to be depicted. Color coding may further highlight which location is best, which is second best and so on. In this instance, green-colored indicator 250-1 is the best location. Alternatively, the parcel 245 may be visually mapped with various estimated RF signal quality readings. Those skilled in the art with recognize that any visual means may be used to provide the user with the RF signal quality across the parcel 245. The primary objective being to highlight those portions/sections/areas of the parcel for installing the broadband reception antenna to achieve the best reception.

Figure 2G:
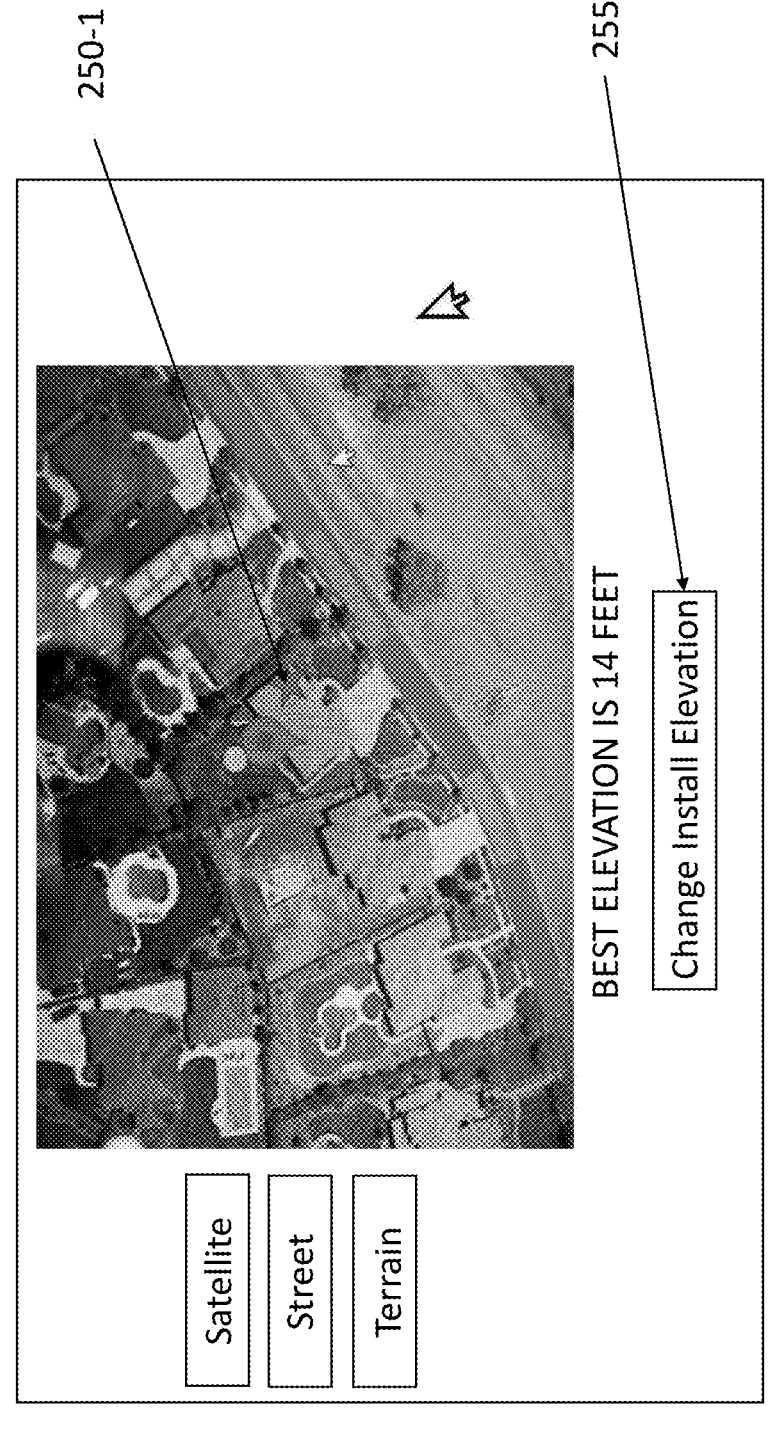

Another factor to consider when evaluating RF signal quality is the elevation of the broadband antenna. Screen shot 200-7 of FIG. 2G shows that the RF signal is best at 14 feet above the ground at the location of indicator 250-1. A change elevation link 255 provides means for the user to enter a different elevation based on what elevation the user is actually able to install the broadband reception antenna (e.g., 10 feet on the roof of a one-story home or business).

Figure 2H:
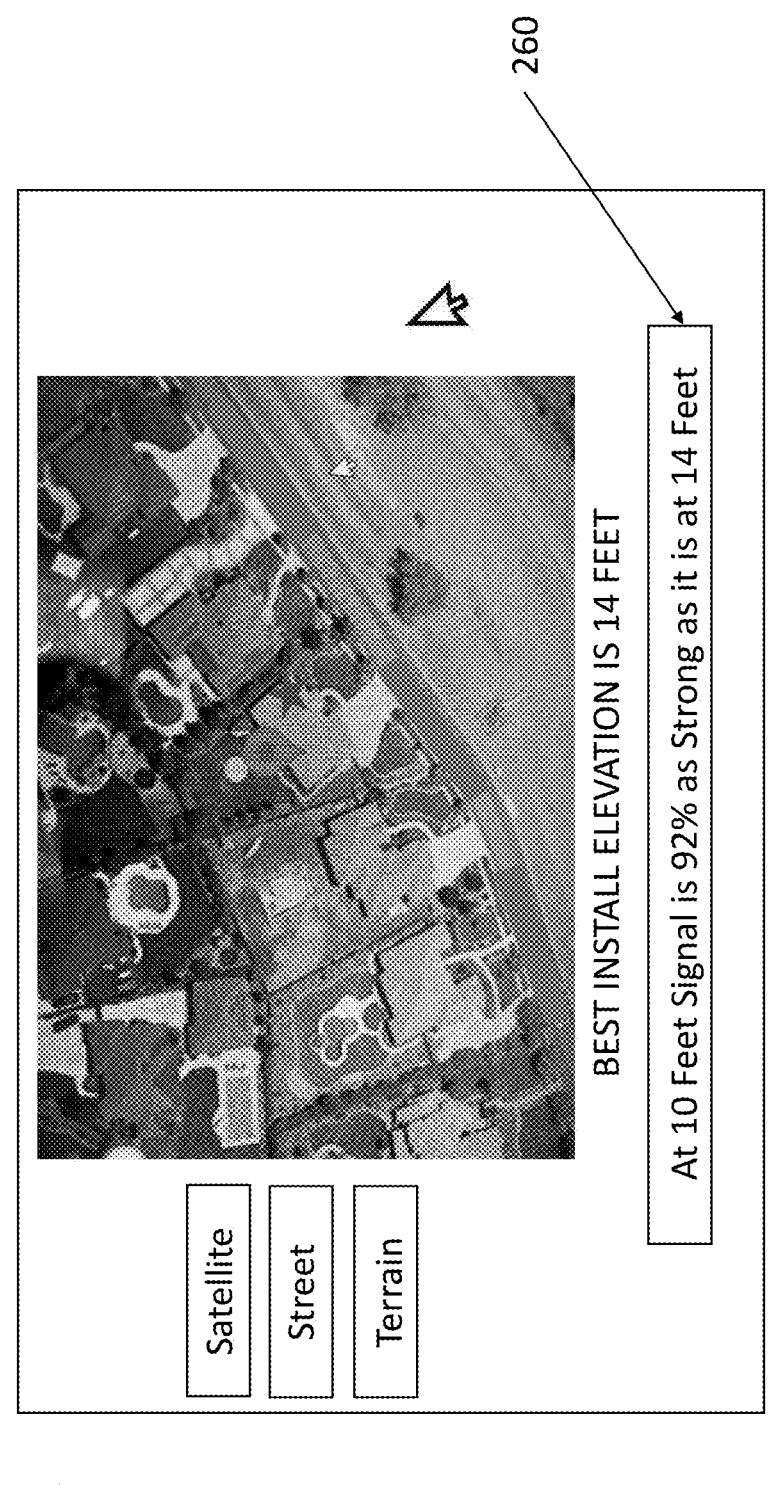
Figure 2I:
Figure 2I:
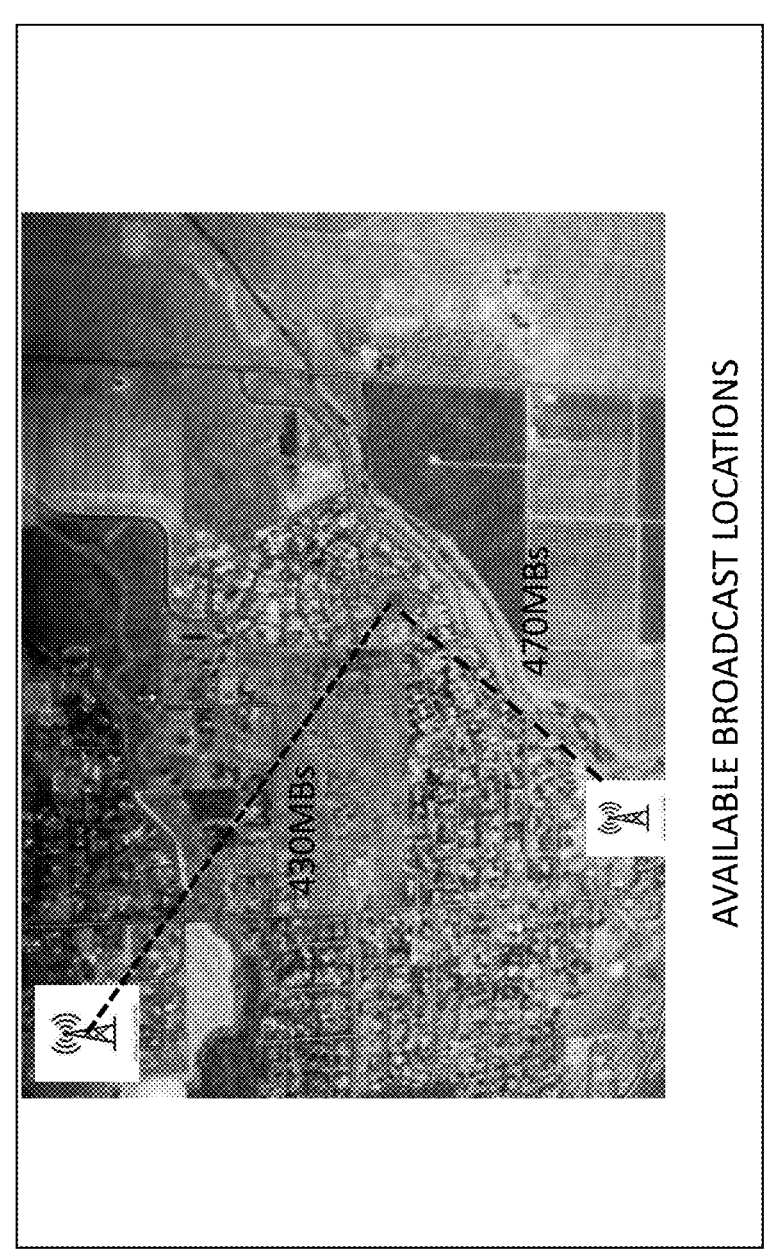
Figure 2I:
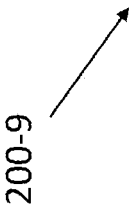

Screen shot 200-8 of FIG. 2H shows the RF signal quality at the desired elevation of 10 feet 260 as input by the user. The user can now decide if they want to install the broadband reception antenna on a 14-foot pole supported by the ground, or a 4-foot pole supported by the roof or accept the reduction in RF signal quality and install the broadband reception antenna on the roof at 10 feet elevation. Screen shot 200-9 of FIG. 2I shows a line between the installation location and the broadcast location (in this case 2 options). Screen shot 200-9 of FIG. 2I may also show other speed and performance data and options. Such performance options may be related to the distance between the parcel and the broadcast locations, antenna install heights, vegetation, etc. In other words, performance may not be related to only the distance between the parcel and the broadcast location.

Figure 3:
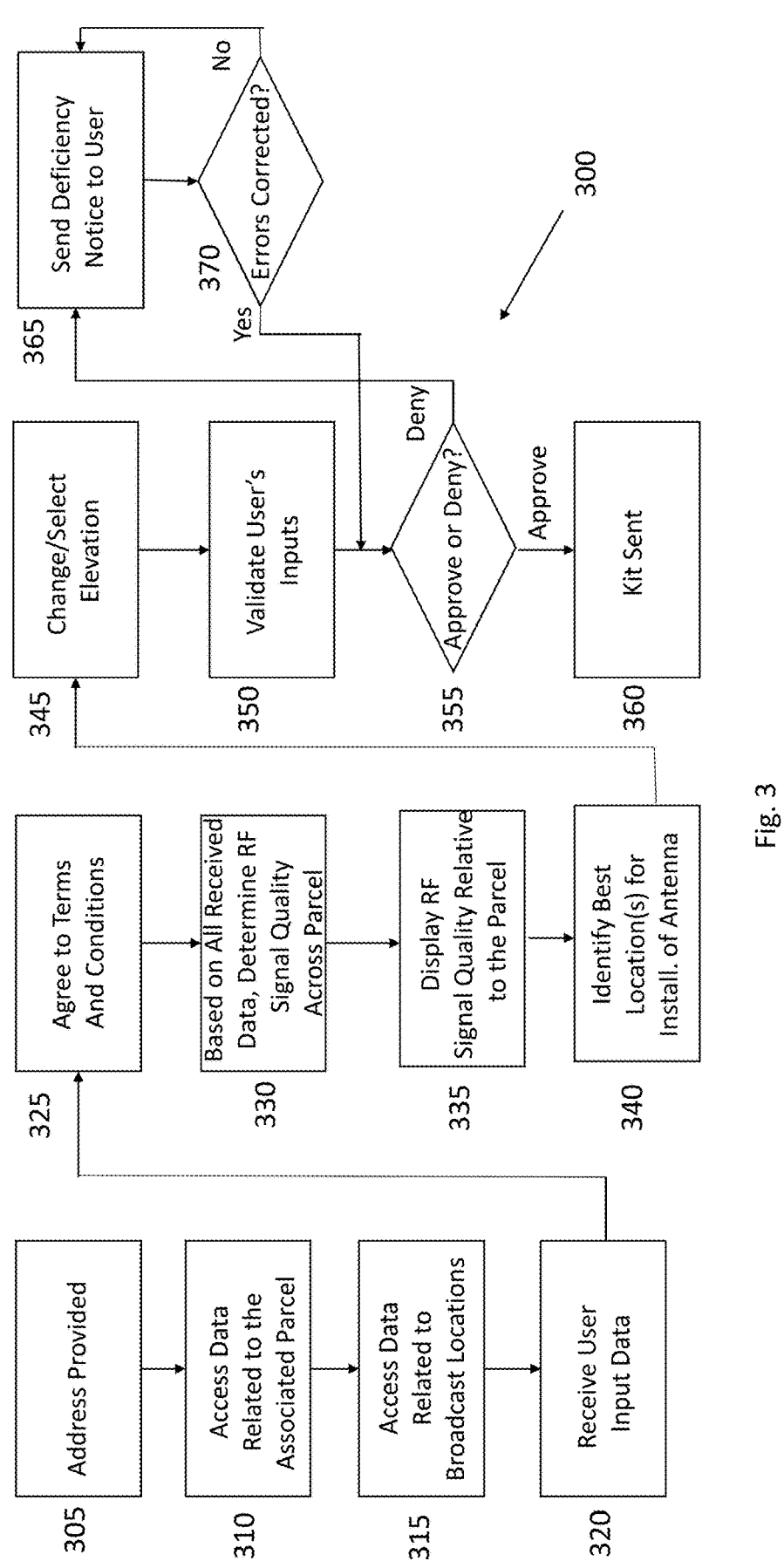
FIG. 3 illustrates a flow chart detailing one methodology for determining best location to install a broadband reception antenna according to the embodiments of the present invention.

FIG. 3 shows a flow chart 300 detailing one methodology for determining a best location for installing a broadband reception antenna according to the embodiments of the present invention. At 305, an address is provided. At 310, data related to a land parcel on which the property address is associated is accessed by the system. The data may be accessed via county assessor systems, paid or free data sources that identify parcel information including address, lot size, lot shape, geocoordinates and locations of buildings, laser imaging, detection and ranging (LIDAR) data to identify the shapes of buildings, vegetation, and other geographic features of the parcel, including the size, geocoordinates, height of each and their proximity to each other within the parcel, as well as their proximity to other buildings, vegetation and other geographic features on other parcels or open space, street views, 3D imaging or any other system that provides data on the characteristics of buildings, vegetation (including density) or parcels (including slope and elevation). At 315, the system access date related to the RF signal broadcast locations. This data may comprise the geocoordinates of the location, the geocoordinates of each broadcast antenna, the azimuth of each broadcast antenna, elevation, tilt, antenna gain, transmit power, operating frequency range or channel, and any attenuation or loss associated with the hardware configuration, or the frequencies used. At 320, the system accepts user information related to the parcel. At 325, the user must agree to the provider's terms and conditions. At 330, based on all received data, the system determines RF signal quality across the parcel. At 335, the system displays the RF signal quality relative to the parcel. At 340, the system determines the best location(s) on the parcel to install the broadband reception antenna. At 345, the user is permitted to adjust the potential elevation of the broadband reception antenna to which the system updates the signal quality. At 350, the user's inputs are validated. At 355, the system or system operator personnel approves or denies the order. If approved, at 360, the system provisions the order and causes a kit containing a broadband reception antenna and equipment necessary to install the same along with instructions to be sent to the user for installation. If denied, at 365, the system sends, via email or text, a deficiencies notice to the user. At 370, it is determined if the errors identified by the system or system operator personnel when denying the order have been corrected by the user. If so, the system returns to step 355 for approval or denial of the order. If not, the system loops back to step 365. The system may be configured to send a maximum number (e.g., 3) of deficiency notices to the user before requiring the user to call the provider for assistance.

Table 1 below shows an exemplary list of components forming the kit.

TABLE 1

| |
|---|
| Antenna |
| Antenna Cable |
| Sealant Squares (6) |
| Clips (25) |
| Elevation Screws |
| Hose Clamps (2) |
| Silicone Sealant |
| Mount Screws (6) |
| Carrying Bag |
| Bracket |
| Zip Ties (4) |
| Power Supply |
| Router |
| Ethernet Cable (2) |
| Wall Plate |

Figure 4:
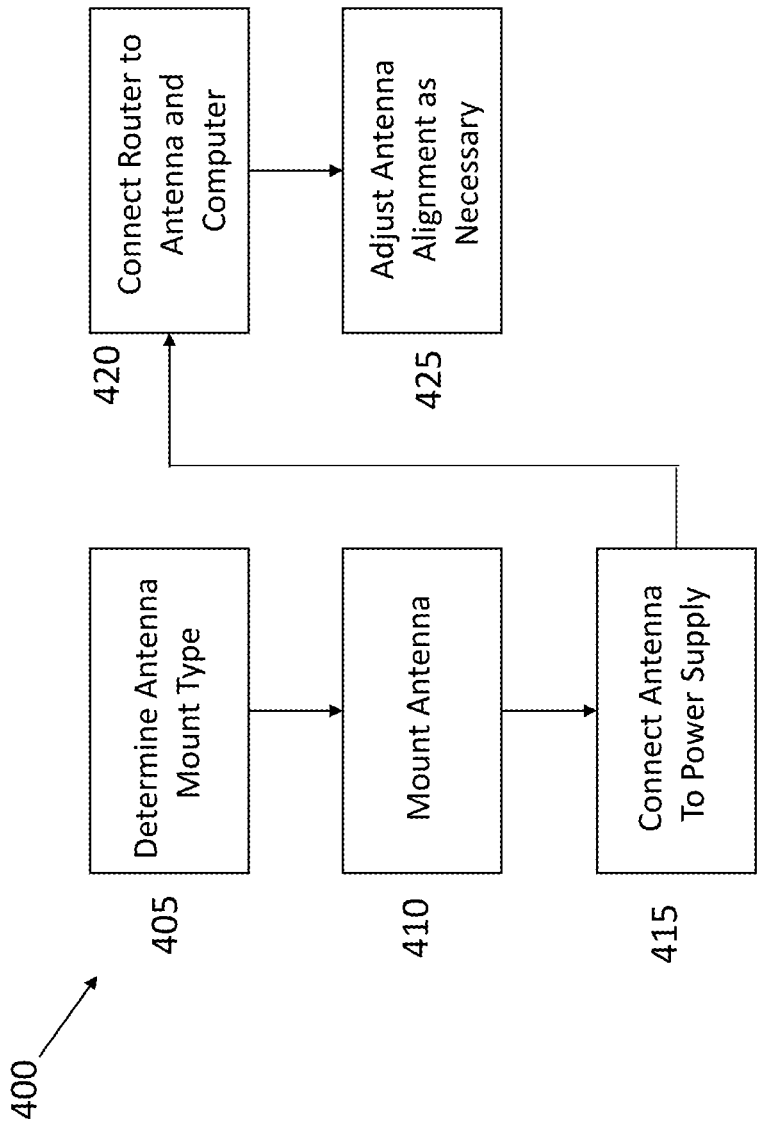
FIG. 4 illustrates a flow chart detailing a methodology following by a user to install, connect and direct a broadband antenna according to the embodiments of the present invention.

Along with the kit, instructions detail how the user is to install, connect and direct the broadband antenna to receive the optimal RF signal. Flow chart 400 of FIG. 4 details an exemplary method for the user to install, connect and direct the broadband antenna. At 405, the user determines the antenna mount type. Mount types may include a tripod mount on a roof or flat surface, J-mount on a roof, side-wall mount or pole mount. At 410, the antenna is mounted according to the one of the mount types. At 415, the antenna is connected to a power supply via an Ethernet cable. At 420, a router is connected. Connecting to the router comprises connecting a first end of an Ethernet cable to the power supply of the Antenna and a second end to the internet port of the router. A first end of a second Ethernet cable is connected to a port of the router and second end to a user's computer. At 425, the antenna alignment is adjusted as necessary. The antenna setup via the user interface (computer or phone application) provides a real-time RF signal quality and target signal score to assist in the alignment of the antenna. A QR code or personalized link may be used to access the interface. The interface may be accessed through a wireless connection, wired connection or Internet connection. As an alternative, the antenna may report to the cloud and the user may collect the antenna information from there using the interface.

Although the invention has been described in detail with reference to several embodiments, additional variations and modifications exist within the scope and spirit of the invention as described and defined in the following claims.

We claim:
1. A system comprising:
at least one processor running executable instructions to:
receive data associated with a parcel of land;
receive signal broadcast data associated with signal broadcast locations proximate to said parcel of land;

based on said data associated with said parcel of land and signal broadcast data, determine RF receiver signal strength at various locations on said subject parcel of land; and
display on a user interface one or more RF signal qualities at one or more locations within the parcel of land based on said RF signal quality map including one or more best RF signal qualities within said parcel of land.

2. The system of claim 1 wherein said data associated with said parcel of land comprises one or more of the following: address, lot size, lot shape, elevation, geocoordinates and locations of buildings.

3. The system of claim 1 wherein said data associated with said parcel of land comprises laser imaging, detection and ranging data to identify the shapes of buildings, vegetation, and other geographic features of said parcel of land.

4. The system of claim 1 wherein said signal broadcast data comprises one or more of the following: geocoordinates of each broadcast antenna, azimuth of each broadcast antenna, elevation, tilt, antenna gain, transmit power, operating frequency range or channel, attenuation or loss associated with hardware configurations and frequencies used.

5. The system of claim 1 further comprising said at least one processor running executable instructions to: receive user-provided elevation data associated with a location for installation of a broadband antenna.

6. The system of claim 1 further comprising said at least one processor running executable instructions to: use Artificial Intelligence for determining a location to install an antenna.

7. The system of claim 1 further comprising said at least one processor running executable instructions to: display RF signal strength from said one or more signal broadcast locations relative to said parcel of land.

8. The system of claim 1 wherein said data associated with said parcel of land comprises growth calculations for vegetation on said parcel of land.

9. A method comprising:
receiving data associated with a parcel of land;
receiving signal broadcast data associated with signal broadcast locations proximate to said parcel of land;
utilizing a processor running executable instructions to:
based on said data associated with said parcel of land and signal broadcast data, determining a RF signal quality map of said subject parcel of land; and
display on a user interface one or more RF signal qualities at one or more locations within said parcel of land based on said RF signal quality map including one or more best RF signal qualities within said parcel of land.

10. The method of claim 9 further comprising receiving data associated with said parcel of land comprising one or more of the following: address, lot size, lot shape, elevation, geocoordinates and locations of buildings.

11. The method of claim 9 further comprising receiving data associated with said parcel of land comprising laser imaging, detection and ranging data to identify the shapes of buildings, vegetation, and other geographic features of said parcel of land.

12. The method of claim 9 further comprising receiving signal broadcast data comprising one or more of the following: geocoordinates of each broadcast antenna, azimuth of each broadcast antenna, elevation, tilt, antenna gain, transmit power, operating frequency range or channel, attenuation or loss associated with hardware configurations and frequencies used.

13. The method of claim 9 further comprising receiving user-provided elevation data associated with a location for installation of a broadband antenna.

14. The method of claim 9 further comprising Artificial Intelligence used identifying the location for installation of a broadband antenna.

15. The method of claim 9 further comprising displaying RF signal strength from said one or more signal broadcast locations relative to said parcel of land.

16. The method of claim 9 further comprising receiving data associated with growth calculations for vegetation on said parcel of land.

17. A system comprising:
    at least one processor running executable instructions to:
        receive data associated with a parcel of land;
        receive signal broadcast data associated with signal broadcast locations proximate to said parcel of land;
        based on said data associated with said parcel of land and signal broadcast data, determine RF receiver signal strength at various locations on said subject parcel of land; and
    display on a user interface one or more RF signal qualities at one or more locations within the parcel of land based on said RF signal quality map.

18. The system of claim 17 wherein said data associated with said parcel of land comprises one or more of the following: address, lot size, lot shape, elevation, geocoordinates and locations of buildings.

19. The system of claim 17 wherein said data associated with said parcel of land comprises laser imaging, detection and ranging data to identify the shapes of buildings, vegetation, and other geographic features of said parcel of land.

20. The system of claim 17 wherein said signal broadcast data comprises one or more of the following: geocoordinates of each broadcast antenna, azimuth of each broadcast antenna, elevation, tilt, antenna gain, transmit power, operating frequency range or channel, attenuation or loss associated with hardware configurations and frequencies used.

21. The system of claim 17 further comprising said at least one processor running executable instructions to: receive user-provided elevation data associated with a location for installation of a broadband antenna.

22. The system of claim 17 further comprising said at least one processor running executable instructions to: use Artificial Intelligence for determining a location to install an antenna.

23. The system of claim 17 further comprising said at least one processor running executable instructions to: display RF signal strength from said one or more signal broadcast locations relative to said parcel of land.

24. The system of claim 17 wherein said data associated with said parcel of land comprises growth calculations for vegetation on said parcel of land.

* * * * *